United States Patent [19]
Harris

[11] Patent Number: 4,941,572
[45] Date of Patent: Jul. 17, 1990

[54] METHOD AND PACKAGE FOR FRESH CUT FLOWER ARRANGEMENTS AND PLANTS

[75] Inventor: Charles C. Harris, St. Louis, Mo.

[73] Assignee: Jetram Sales, Inc., St. Louis, Mo.

[21] Appl. No.: 357,062

[22] Filed: May 24, 1989

[51] Int. Cl.$^5$ .................. B65D 85/50; A01G 9/02; B65B 55/18
[52] U.S. Cl. .................. 206/423; 206/524; 206/497; 206/204; 206/620; 206/523; 206/486; 428/23; 53/431; 53/441; 53/472; 47/41.12; 47/84
[58] Field of Search ............... 206/423, 524, 523, 497, 206/204, 620, 486; 47/84, 41.12; 428/23; 53/472, 431, 441

[56] References Cited

U.S. PATENT DOCUMENTS

| | | | |
|---|---|---|---|
| 3,552,059 | 1/1971 | Moore | 47/41.12 |
| 3,874,115 | 4/1975 | Liondon et al. | 206/423 X |
| 4,034,507 | 7/1977 | Dedolph | 47/84 X |
| 4,075,786 | 2/1978 | Van Zyl | 206/423 X |
| 4,662,107 | 5/1987 | Van Den Kieboom | 47/84 |
| 4,815,603 | 3/1989 | Harris | 206/497 |

FOREIGN PATENT DOCUMENTS 2176399 12/1986 United Kingdom ............... 47/41.12

Primary Examiner—William I. Price
Attorney, Agent, or Firm—Ronald W. Hind

[57] ABSTRACT

The package (10) for shipping and storing articles such as cut flower arrangements (14) includes a flower container (12) lower portion is provided with a water-containing absorbent foam block (18) receiving the flower stems (38) in pierced relation and a block (20) of non-absorbent, relatively rigid foam, above the absorbent block sealing said block and said flower stems in place. A plastic film vented shell (16) is disposed about the flowers and connected to the container in shrink-wrap relation. The package includes U-shaped insert (22) which holds the container firmly in place in the shipping carton (24) and refrigerated gel envelopes to ensure freshness of the flowers on arrival at their destination. In another embodiment, the package is used for shipping potted plants (114) which are rooted in a growing medium (118) which is covered with a layer of non-absorbent foam (120) and in another embodiment, the package utilizes a quantity of water (218) which directly receives the cut flowers and is covered with a layer of non-absorbent foam (220).

22 Claims, 5 Drawing Sheets

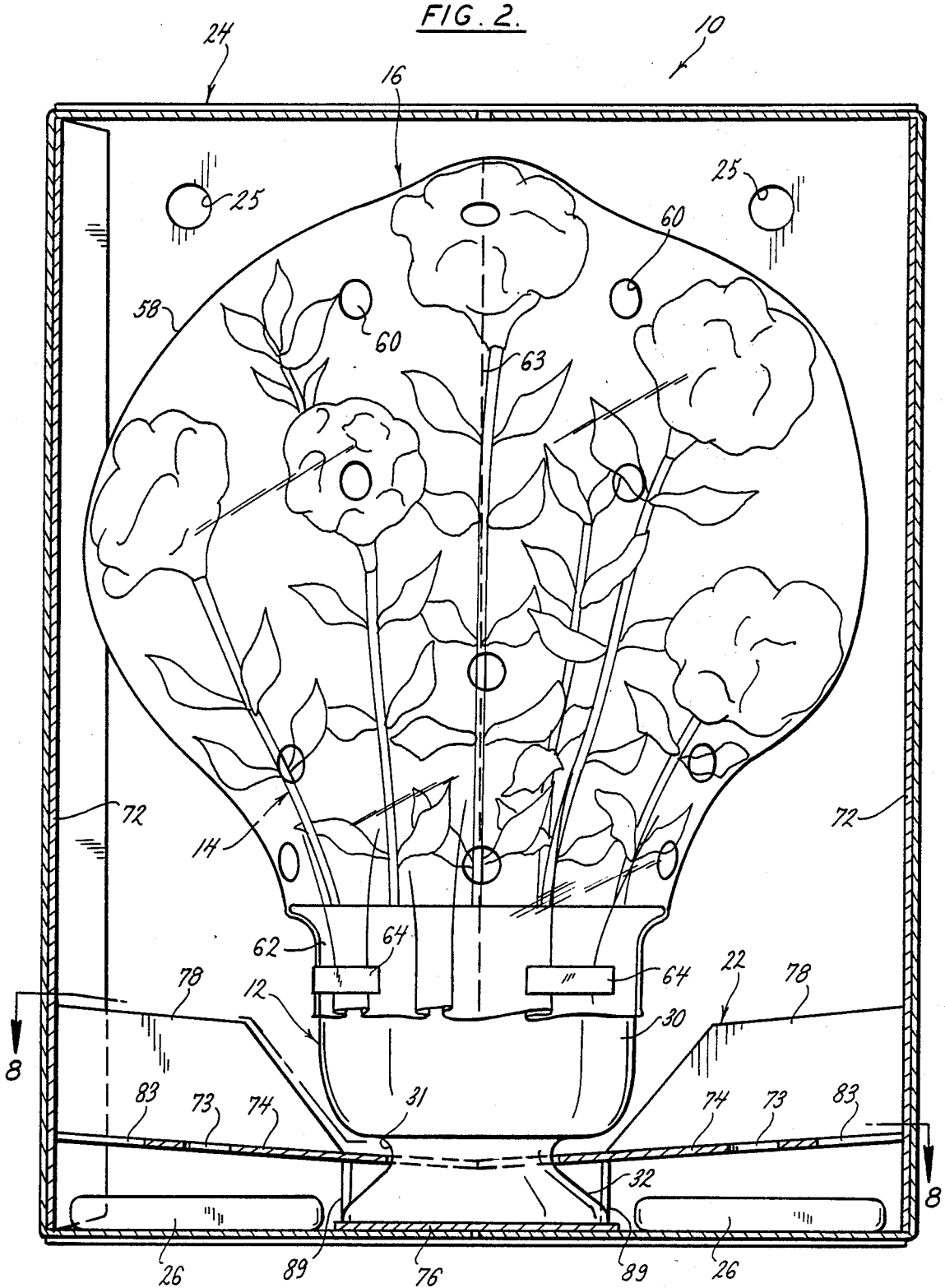

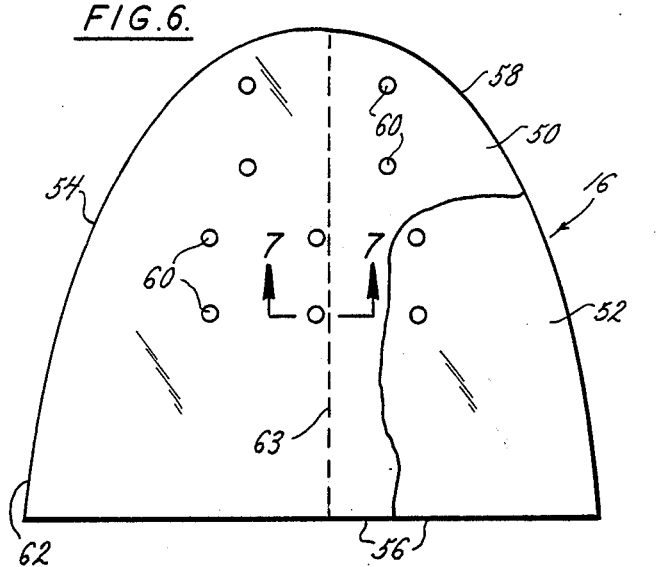
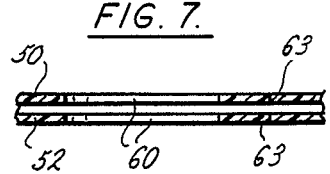
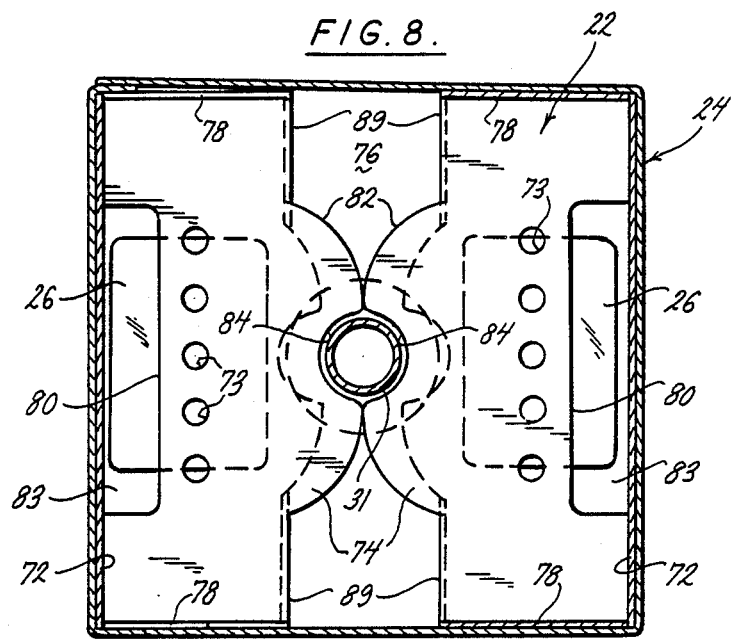
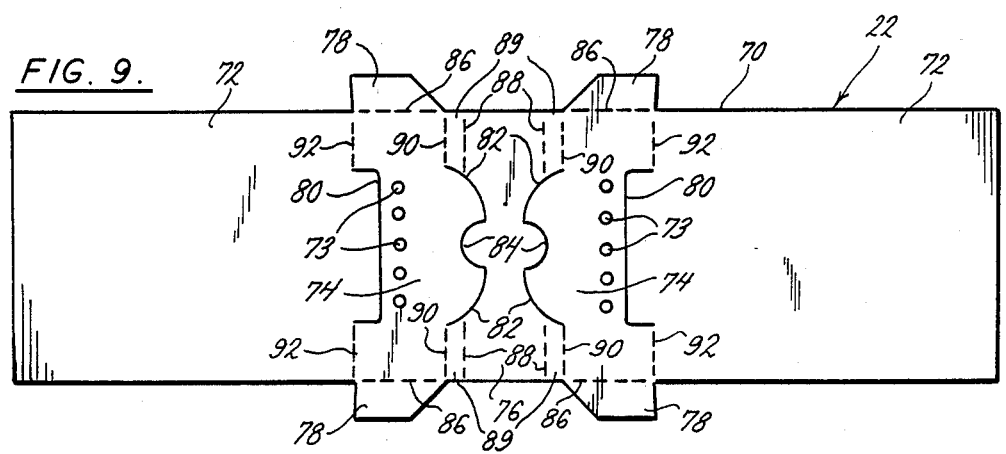

METHOD AND PACKAGE FOR FRESH CUT FLOWER ARRANGEMENTS AND PLANTS

BACKGROUND OF THE INVENTION:

This invention relates to the packaging of articles and particularly to a package for shipping and storing fresh cut flower arrangements and plants.

There are at least two major problems encountered in providing for the shipment of cut flowers and plants so that they arrive at their destination in fresh condition after a journey of many hours and considerable handling. The first problem is that the flowers and plants require water. The second problem is that the delicate flowers or plant foliage must be securely held during shipment. The first problem, with respect to cut flowers only, is addressed in U.S. Pat. No. 3,552,059 which discloses the use of a water filled block of absorbent floral foam having a plastic liner and contained in an open top cardboard box placed in the base of a shipping carton. With this assembly it is intended that the cut flowers puncture the liner and obtain sustaining moisture during delivery. While this item works well when the box is vertical, there is a tendency for the water to leak from the punctured liner. Moreover, the block itself does not adequately support the flowers during delivery and, in fact, the problem of holding the cut flowers has not been adequately solved. In addition, floral foam cannot be effectively used for potted plants.

The present invention solves the above problems in a manner not disclosed in the known prior art.

SUMMARY OF THE INVENTION:

This package provides a means of shipping articles such as cut flower arrangements and plants over long distances of many hours duration under rough handling conditions so that they arrive at their destination in a fresh condition.

The package provides for the watering of the articles without leakage and also provides for holding the articles securely in the shipping carton during delivery to the recipient.

This package for horticultural articles comprises a container for the article including an upper portion and a lower portion; a water-containing absorbent material disposed in the lower portion of the container adapted to receive the horticultural article; a foamed-in-place non-absorbent foam block disposed in the upper portion of the container above the absorbent foam block substantially completely filling the upper portion of the container to a selected level to support the article in a generally upright position and forming a substantially impervious cap for the absorbent material; a cover of plastic film disposed about the horticultural article, and a shipping container receiving the article container therewithin including means for holding the article container in a stable condition during shipping.

In one aspect of this invention the horticultural article is an arrangement of fresh flowers having cut stems, and the water-containing absorbent material is a foam block adapted to receive the stems in pierced relation.

In another aspect of the invention the horticultural article is a potted plant and the water-containing absorbent material is a porous growing medium.

It is an aspect of this invention to provide that the absorbent foam block disposed beneath the non-absorbent foam block includes a substantially sealed, flower stem pierceable, plastic film cover.

It is another aspect of this invention to provide that the plastic film cover disposed about the article is formed from shrink-wrap plastic and includes an upper vented portion supporting the article above the non-absorbent foam block and a lower portion wrapped around the container in shrink-wrap relation.

Yet another aspect of this invention is to provide that the plastic film cover is formed from front and rear panels, each panels including a tear perforation to facilitate removal of the cover from the article and the container.

Still another aspect of this invention is to provide that the plastic film cover is formed from front and rear panels and include an upper domed shaped margin and a straight transverse lower margin and each panel includes a longitudinal tear perforation extending from the upper margin to the lower margin to facilitate removal of the cover from the article and the container.

It is an aspect of this invention to provide that the article container includes a base portion having a neck; the shipping container includes a bottom wall and peripheral side walls, and the means holding the article container include an insert having a bottom platform portion spaced above the shipping container bottom wall and disposed in embracing relation about the flower container neck.

It is another aspect of this invention to provide that the shipping container includes a bottom wall and peripheral side walls, and the means holding the flower container include elastic means extending between the shipping container and the article container.

Yet another aspect of this invention is to provide that the flower container includes an upper margin means, and the means holding the flower container in place include an insert having a bottom portion and a plurality of elastic elements anchored to the insert bottom portion and extending to the article container upper margin and connected thereto in elastic tie-down relation.

Still another aspect of this invention is to provide that the article container upper portion includes an annular rim defining the selected upper level of the foamed-in-place non-absorbent foam block.

Another aspect of this invention is to provide a container for a horticultural article comprising a container for the article including an upper portion and a lower portion; a water-containing absorbent foam block disposed in the lower portion of the container adapted to receive the article, and a non-absorbent foam block secured in the upper portion of the container above the absorbent material and forming a substantially impervious cap for the absorbent material.

Another aspect of this invention is to provide that the non-absorbent foam block is foamed in place and the container upper portion includes an upper margin and an annular rim disposed below the upper margin and defining the selected upper level of the foamed-in-place non-absorbent foam block.

It is another aspect of this invention to provide a method of packaging horticultural articles in a container for shipment in a carton comprising the steps of placing a water-containing absorbent material in the lower portion of the container; disposing the article in the water absorbent material; and foaming-in-place in the upper portion of the container a non-absorbent foam block above the water absorbent material to hold the article in place and substantially seal the water absorbent material from ambience and another aspect to provide a method comprising the additional steps of covering the articles with a shell of shrink wrap plastic; applying heated air to the shell to connect it to the container; attaching the container to an insert, and fitting the insert into a shipping carton.

Yet another aspect of this invention is to provide a method of forming the shell from front and rear panels and having contoured upper margins, transverse lower margins, and perforating the panels with vent openings prior to shrinking.

Still another aspect of this invention is to provide a method of forming longitudinal tear lines in the plastic shell panels to facilitate removal from the container.

Another aspect of this invention is to provide a method in which the article is a fresh cut flower arrangement and the absorbent material is floral foam which is pierced by the cut stems.

It is still another aspect of the invention to provide a container for a horticultural article comprising a container for the article including an upper portion and a lower portion; a quantity of liquid disposed in the lower portion of the container and adapted to receive the article; and a non-absorbent foam block disposed in the upper portion of the container above the liquid and forming a substantially impervious cap for the liquid.

Another aspect of the invention is to provide that the non-absorbent foam block is foamed in place.

Still another aspect of the invention is to provide that the non-absorbent foam block is a pre-formed foam block, and securing means secure the foam block to the container.

It is another aspect of this invention to provide a method of packaging horticultural articles in a container for shipment comprising the steps of placing a quantity of liquid in the lower portion of the container; disposing the article in the liquid; and securing a non-absorbent foam block in the container above the liquid and to form a substantially impervious cap for the liquid.

It is an aspect of this invention to provide a package for cut flowers and plants which is simple and inexpensive to manufacture and extremely effective for delivering fresh cut flowers and plants.

BRIEF DESCRIPTION OF THE DRAWINGS:

FIG. 2 is an enlarged cross-sectional view of the shipping container for a flower container;

FIG. 6 is an elevational view of the shrink wrap shell in the flat, pre-shrunk condition;

FIG. 7 is an enlarged cross-sectional view taken on line 7—7 of FIG. 6;

FIG. 8 is a cross-sectional view taken on line 8—8 of FIG. 2;

FIG. 9 is a plan view of the shipping container insert blank;

Figure 1:
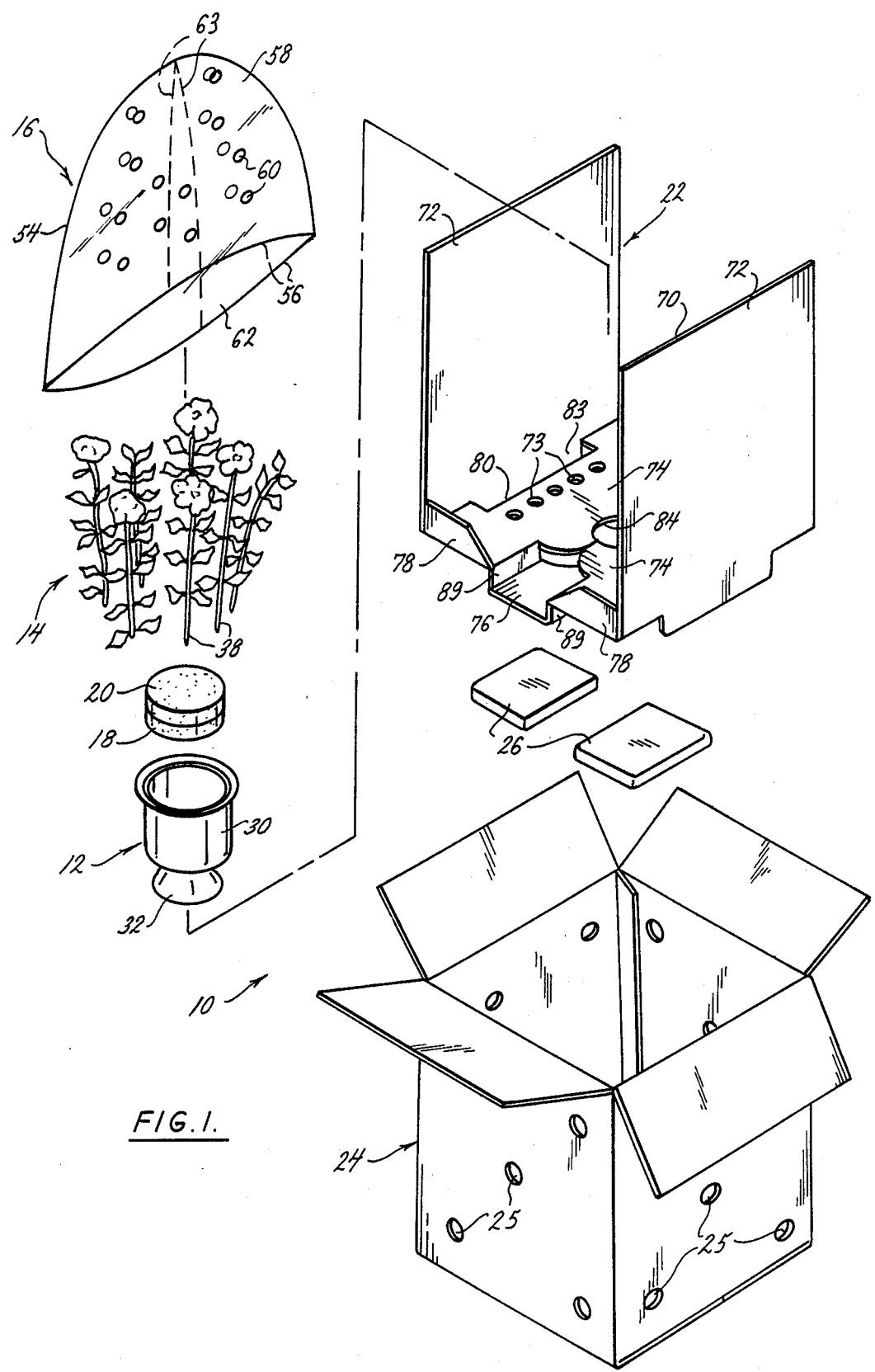
FIG. 1 is an exploded view of the package components.
Figure 3:
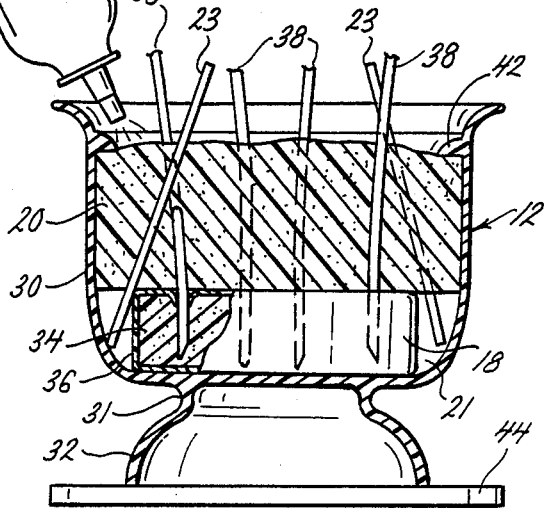
FIG. 3 is an enlarged cross-sectional view through the flower container prior to wrapping.

DESCRIPTION OF THE PREFERRED EMBODIMENT:

Referring now by reference numerals to the drawings and first to FIGS. 1, 2 and 3 it will be understood that the package 10, in the embodiment shown, is intended for use in shipping a container 12 containing an arrangement of fresh cut flowers 14 wrapped in a plastic film shell 16, said flower arrangement constituting a horticultural article. The flowers 14 are held in the container by a foam block 20 disposed above a water-containing and retaining absorbent foam block 18. A generally U-shaped insert 22 is used to hold the wrapped container securely in place during transportation of the container in a shipping carton 24 and the carton is provided with pre-refrigerated gel packets 26. The components of the package 10 will now be more particularly described.

The container 12, as best shown in FIG. 3 includes a bowl portion 30 and a base portion 32 and may be of a lightweight plastic material. The bowl portion includes a lower portion containing the water-containing absorbent foam block 18 which may be of the type disclosed in U.S. Pat. No. 3,552,059, and incorporated herein by reference, having a core 34 which is sealed by a plastic film skin 36. The block 18 may also have a skeletal cardboard frame (not shown). The skin 36 is of a thickness to be readily pierced or punctured by the individual stems 38 of the cut flowers 14. The flower stems 38 are firmly held in place above the absorbent foam block 18 by the non-absorbent foam block 20 in the upper portion of the bowl. It will be understood that "upper" and "lower" portions as used herein are relative terms and refer to the relative locations of the foam blocks 18 and 20 when the container 12 is vertical. In the preferred embodiment, the block 20 is foamed-in-place from an aerosol can 40 such as Polycel insulating sealant manufactured by W. R. Grace & Co. of Cambridge, MA. The foam expands to many times its original size and adheres to the inside of the container. As shown in FIG. 3 the bowl 30 may include an upper annular rim 42 which roughly defines the upper face of the foam block 20 and is of assistance in retaining the foam during the foaming process and also for holding the foam block 20 in place during transportation. It has been found helpful also to provide a turntable 44 to assist in the foaming process. Although, as shown, the foam is emplaced after the flower stems 38 have been inserted in place into the block 18, the stems can also be poked through the foam block 20 and into said foam block 18 prior to the setting up of said foam block 20 to facilitate the arranging of the flowers. As will be readily understood, in addition to holding the flower stems 38 firmly in place, the foam block 20 also seals and insulates the absorbent foam block 18 since it provides a cross sectionally complete water resistant, impervious cap for said block 18. It will also be understood that the foam can be colored, for example green or brown, to enhance the appearance thereof. Also, a pre-formed foam block can be adhesively secured in place in lieu of being foamed-in-place as will be later described.

As shown in FIG. 3 the non-absorbent foam block 20 tends to produce an annular cavity 21. In the embodiment shown two sticks 23 are provided which extend into said cavity and can be removed by the recipient to add water into the cavity area.

Figure 4:
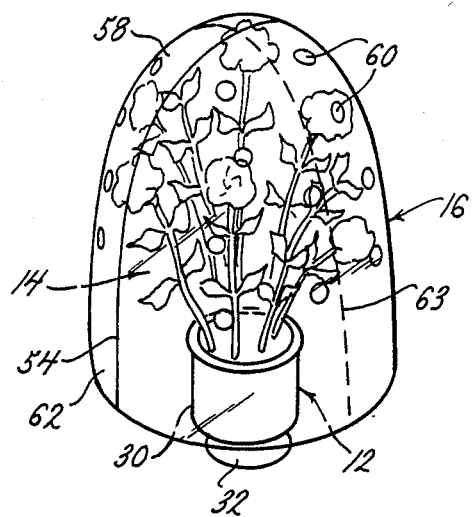
FIG. 4 is a perspective view of the shell emplaced over the flower container prior to shrinking.
Figure 5:
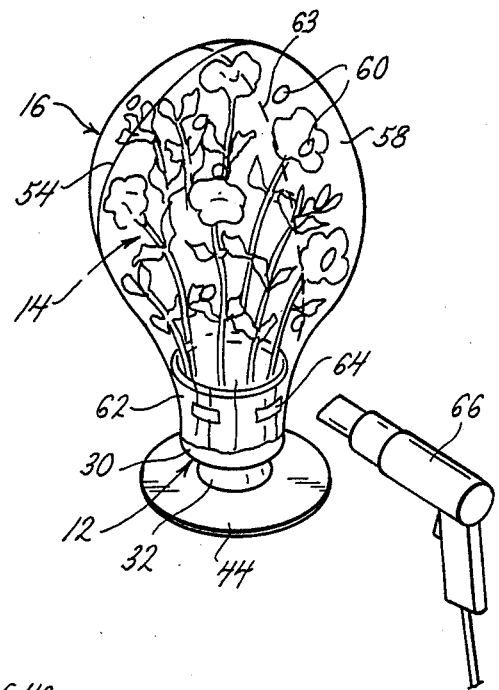
FIG. 5 is a similar view to FIG. 4 during the shrinking process.

In the embodiment shown, the cut flowers 14, now firmly held in the container 12, are next covered with shrink plastic film as shown in FIGS. 4 and 5. The shrink wrap film may be in the form of a vented plastic shell 16 as shown in FIGS. 6 and 7 such as described in co-owned U.S. Pat. No. 4,815,603 which is incorporated herein by reference. The shell 16 is formed from front and rear panels 50 and 52 each defined by arcuate heat sealed margins 54 and generally straight transverse margins 56. The shell 16 includes an upper portion 58 defined by a plurality of openings 60 and a lower skirt portion 62. The openings 60 in the front and rear panels 50 and 52 are in register and are of a size and number to permit air flow through the shell in a shrunk condition. The front and rear panels 50 and 52 include elongate perforation tear lines 64, also in register to facilitate the opening of the package. In the embodiment shown the final upper perforation intersects the upper margin to further facilitate tearing.

As shown in FIGS. 4, 5 and 6 the generally dome-shaped shell 16 is placed over the container 12 and flowers 14 and the shell skirt portion 62 is gathered about the container bowl 30 and may be temporarily held in place as by strips of adhesive tape 63. Following this the shell is heat shrunk as by means of a hot air gun 66 so that the skirt is secured to the container bowl 30. The turntable 44 may be used to rotate the container 12 and shell 16 to facilitate this process. It will be understood that flower arrangements are often stored, prior to shipping, in a refrigerated unit having fans to agitate the air. The vented shells assist in maintaining the flowers in a fresh condition during storage.

It is next necessary to place the wrapped flower container 12 in the shipping carton 24. The carton 24 in the preferred embodiment is of corrugated cardboard and the flower container 12 is held within said carton 24 by means of the U-shaped insert 22 which, in the embodiment shown, is also of corrugated cardboard. In one embodiment, the insert 22 is formed from a symmetrical blank 70 having wall portions 72, platform portions 74 having vent openings 73, a central base portion 76 and wall tabs 78. The blank 70 is provided with U-shaped cuts 80, and arcuate cuts 82 and 84. Side bend lines 86 and transverse bend lines 88, 90 and 92 are also provided so that when the blank is bent about the bend lines it assumes the shape of the insert 22 shown in FIGS. 1, 2 and 8. In this configuration, the platform portions 74 move inwardly so that the margins formed by the cut lines 84 embrace the container neck 31 formed between the bowl 30 and base 32 as best shown in FIG. 2. As also shown in FIG. 2 the container base 32 seats on the insert base 76. Cut lines 80 form outer vertical spacing tabs and access openings 83 while bend lines 88 and 90 form inner spacers 89. As will be understood the blank 70 is dimensioned so that the insert 22 formed thereon snuggly fits within the shipping carton 24 and tabs 78 assist in holding the insert 22 in place within said carton. The carton may include perforations 25 to provide ventilation.

The result of this structural arrangement of parts is that the flower stems 38 are firmly held in the container 12 by the relatively rigid foam block 20 while the absorbent foam block 18 supplies the necessary moisture to the flowers. In addition, the shrink wrap shell 16 which is, in effect, custom shrunk about the flowers provides additional support so that in shipping the shrink wrapped flowers are held by the container base with the flowers themselves being suitably spaced from the walls of the insert 22 and carton 24 to preclude damage to the flowers and foliage. The arrangement also provides that the carton can be subjected to turning on its side or even on its head substantially without water leakage or damage to the flowers.

Figure 11:
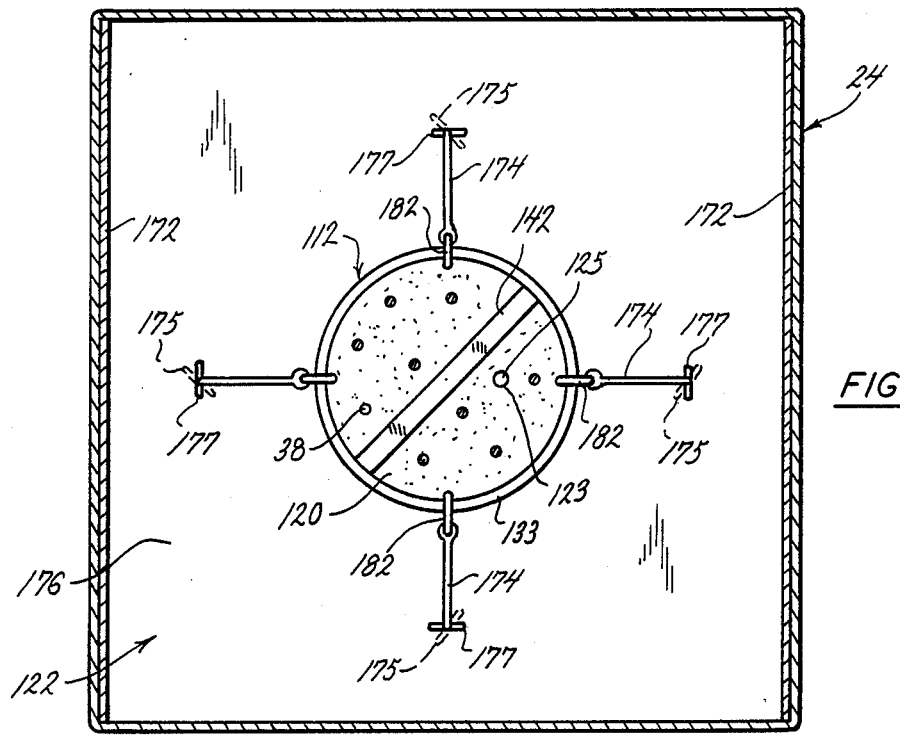
FIG. 11 is a cross-sectional view taken on line 11—11 of FIG. 10.
Figure 10:
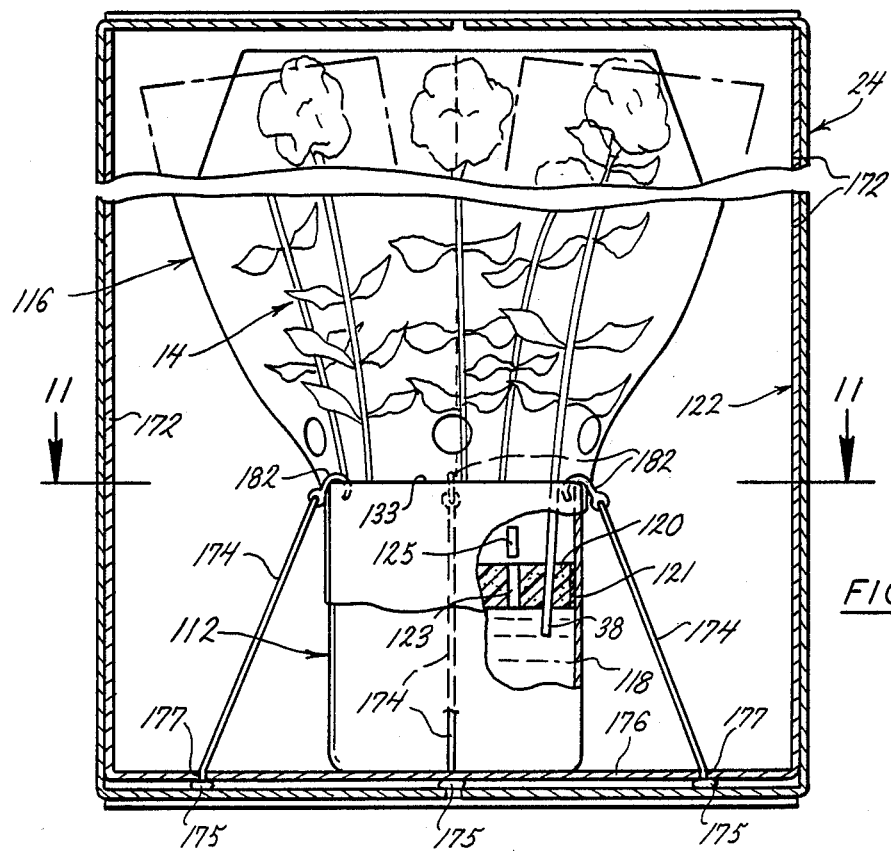
FIG. 10 is a fragmentary cross-sectional view similar to FIG. 2 showing a modified package.

Another embodiment is disclosed in FIGS. 10 and 11. Many of the component parts such as the flower arrangement the shrink wrap shell and the carton are identical and are given the same reference numeral for convenience. In this embodiment the non-absorbent upper foam block 120 is disposed directly over a quantity of liquid such as water indicated by numeral 118 contained in the lower portion of the container 112. As with the previous embodiment the non-absorbent foam block 120 may be foamed-in-place. Alternatively, it may be in the form of a preformed foam block of a suitable rigid foam material through which the flower stems 38 may be pushed into contact with the liquid. When a preformed block 120 is used it must be sealed to the container as by a circumferentially applied, water resistant adhesive 121. Since it is desirable to provide a means of escape for the water displaced by the flower stems 38, at least one opening 123 is provided which may be filled later by a plug 125. In lieu of the annular container rim of the previous embodiment the foam block 120 may be held in place by a diametrical bar 142 which may be held in place by adhesive or by springing in place prior to foaming. Also, as shown in FIG. 10, the plastic shrink wrap shell 116, in lieu of being dome-shaped, may be generally rectangular so that the upper end is provided with corners or "dog-ears" which can be grasped by the recipient and pulled outwardly to facilitate removal of said shell 116.

FIGS. 10 and 11 also disclose an alternative embodiment of an insert 122 which is fitted into the carton 24 and is suitable for use with containers 112 which have straight sides and which are held in place by a plurality of elastic members 174 extending between the container 112 and the insert 122. In this embodiment the insert is a simple U-shaped member having sidewalls 172 and a base 176 which includes a plurality of slits 177. The slits 177 receive the lower ends of elastic members 174 which are formed by transverse metal tabs 175, in anchored relation. The elastic members 174 have hooks 182 at their upper ends engageable with the container rim 133 to hold the container 112 firmly in place within the shipping carton 24. In other respects this package is the same as described above.

Figure 12:
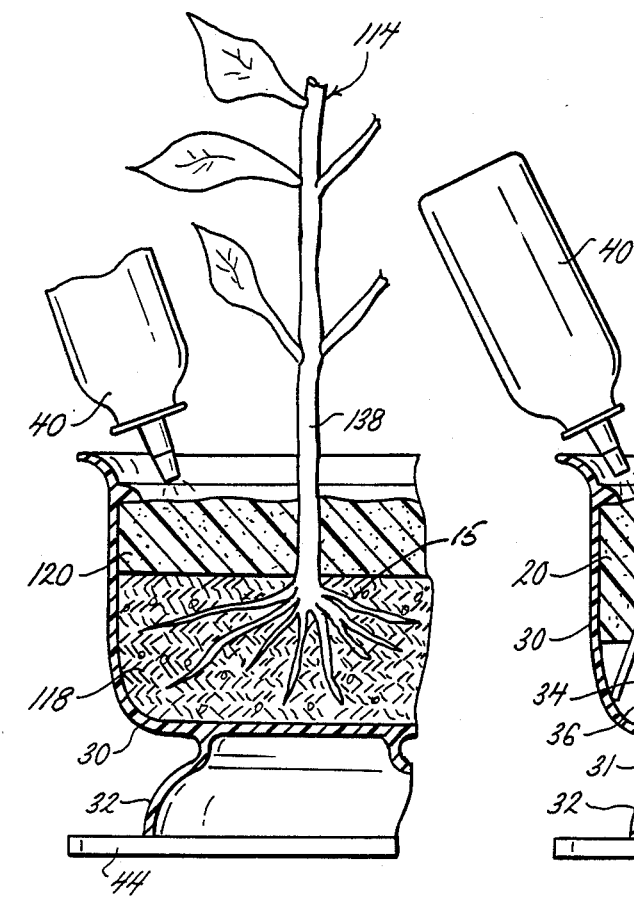
FIG. 12 is similar to FIG. 3 but showing a plant in lieu of a cut flower arrangement.

FIG. 12 discloses another embodiment which is suitable for shipping plants, rather than cut flower arrangements. As will be understood, such plants also constitute horticultural articles. This embodiment is also similar to the embodiment discussed above and shown in FIG. 3 so that the same parts are indicated by the same reference numerals. However, as shown in FIG. 12 the container bowl portion 30 includes a lower layer of an absorbent granular growing medium 118 in lieu of the floral foam 18 which provides a base for a plant 114 which is to be shipped in lieu of the cut flower arrangement 14. Such a growing medium may include vermiculite, wood pulp, perlite and even organic soil and is quite porous and holds the root system 15 securely. As in the first embodiment an upper layer 120 is provided which is foamed in place from an aerosol can 40 which securely holds the plant stem 138 in place. The foam layer 120 seals and insulates the absorbent growing medium. It can be readily removed by the recipient to expose the growing medium by simply cutting it away following arrival at its destination.

Although the improved package has been described by maked particularized reference to preferred embodiments, the details of description are not to be understood as restrictive, numerous variants being possible within the principles disclosed and within the fair scope of the claims hereunto appended.

I claim as my invention:

1. A package for horticultural articles, the package comprising:
    (a) a container for a horticultural article including an upper portion and a lower portion,
    (b) a water-containing absorbent material disposed in the lower portion of the container adapted to receive the horticultural article,
    (c) a foamed-in-place non-absorbent foam block disposed in the upper portion of the container above the absorbent material substantially completely filling the upper portion of the container to a selected level to support the article in a generally upright position and forming a substantially impervious cap for the absorbent material,
    (d) a cover of plastic film disposed about the horticultural article, and
    (e) a shipping container receiving the article container therewithin including means for holding the article container in a stable condition during shipping.

2. A package as defined in claim 1, in which:
    (f) the horticultural article is an arrangement of fresh flowers having cut stems, and
    (g) the water-containing absorbent material is a foam block adapted to receive the stems in pierced relation.

3. A package as defined in claim 1, in which:
    (f) the horticultural article is a potted plant, and
    (g) the water-containing absorbent material is a porous growing medium.

4. A package as defined in claim 2, in which:
    (h) the absorbent foam block disposed beneath the non-absorbent foam block includes a substantially sealed, flower stem pierceable, plastic film cover.

5. A package as defined in claim 1, in which:
    (f) the plastic film cover disposed about the article is formed from shrink-wrap plastic and includes an upper vented portion supporting the article above the non-absorbent foam block and a lower portion wrapped around the container in shrink-wrap relation.

6. A package as defined in claim 5, in which:
    (g) the plastic film cover is formed from front and rear panels, each panels including a tear perforation to facilitate removal of the cover from the article and the container.

7. A package as defined in claim 5, in which:
    (g) the plastic film cover is formed from front and rear panels and include an upper domed shaped margin and a straight transverse lower margin and each panel includes a longitudinal tear perforation extending from the upper margin to the lower margin to facilitate removal of the cover from the article and the container.

8. A package as defined in claim 1, in which:
    (f) the article container includes a base portion having a neck,
    (g) the shipping container includes a bottom wall and peripheral side walls, and
    (h) the means holding the article container include an insert having a bottom platform portion spaced above the shipping container bottom wall and disposed in embracing relation about the article container neck.

9. A package as defined in claim 1, in which:
    (f) the shipping container includes a bottom wall and peripheral side walls, and
    (g) the means holding the article container include elastic means extending between the shipping container and the article container.

10. A package as defined in claim 9, in which:
    (h) the article container includes an upper margin means, and
    (i) the means holding the article container in place include an insert having a bottom portion and a plurality of elastic elements anchored to the insert bottom portion and extending to the article container upper margin and connected thereto in elastic tie-down relation.

11. A package as defined in claim 1, in which:
    (f) the article container upper portion includes an annular rim defining the selected upper level of the foamed-in-place non-absorbent foam block.

12. A container for a horticultural article, comprising:
    (a) a container for the article including an upper portion and a lower portion,
    (b) a water-containing absorbent material disposed in the lower portion of the container adapted to receive the article, and
    (c) a non-absorbent foam block secured in the upper portion of the container above the absorbent material and forming a substantially impervious cap for the absorbent material.

13. A container as defined in claim 12, in which:
    (d) the non-absorbent foam block is foamed in place, and
    (e) the article container upper portion includes an upper margin and an annular rim disposed below the upper margin and defining the selected upper level of the foamed-in-place non-absorbent foam block.

14. A method of packaging horticultural articles in a container for shipment comprising the steps of:
    (a) placing a water-containing absorbent material in the lower portion of the container;
    (b) disposing the article in the water absorbent material; and
    (c) foaming-in-place in the upper portion of the container a non-absorbent foam block above the water absorbent material to hold the article in place and substantially seal the water absorbent block from ambience.

15. A method as defined in claim 14, including the further steps of:
    (d) covering the article with a shell of shrink wrap plastic;
    (e) applying heated air to the shell to connect it to the container;
    (f) attaching the container to an insert, and
    (g) fitting the insert into a shipping carton.

16. A method as defined in claim 15, including the further steps of:
    (h) forming the shell from front and rear panels and having contoured upper margins, transverse lower margins, and (i) perforating the panels with vent openings prior to shrinking.

17. A method as defined in claim 16, including the further step of:

(j) forming longitudinal tear lines in the plastic shell panels to facilitate removal from the container.

18. A method as defined in claim 14, in which:

(d) the article is a fresh flower arrangement having cut stems, and (e) the absorbent material is floral foam which is pierced by the cut stems.

19. A container for a horticultural article comprising:

(a) a container for the article including an upper portion and a lower portion;

(b) a quantity of liquid disposed in the lower portion of the container and adapted to receive the article; and (c) a non-absorbent foam block disposed in the upper portion of the container above the liquid and forming a substantially impervious cap for the liquid.

20. A container as defined in claim 19, in which:

(d) the non-absorbent foam block is foamed in place.

21. A container as defined in claim 20, in which:

(e) the non-absorbent foam block is a pre-formed foam block, and (f) securing means secure the foam block to the container.

22. A method of packaging horticultural articles in a container for shipment comprising the steps of:

(a) placing a quantity of liquid in the lower portion of the container;

(b) disposing the article in the liquid; and (c) securing a non-absorbent foam block in the container above the liquid and to form a substantially impervious cap for the liquid.

* * * * *

UNITED STATES PATENT AND TRADEMARK OFFICE
CERTIFICATE OF CORRECTION

PATENT NO. : 4,941,572

DATED : July 17, 1990

INVENTOR(S) : Harris

It is certified that error appears in the above-identified patent and that said Letters Patent is hereby corrected as shown below:

Column 5, line 18 delete "64", insert --63--.

Column 5, line 26 delete "63", insert --64--.

Signed and Sealed this

Twenty-eighth Day of July, 1992

Attest:

DOUGLAS B. COMER

*Attesting Officer*   *Acting Commissioner of Patents and Trademarks*